US011339087B2

United States Patent
Mishiro et al.

(10) Patent No.: US 11,339,087 B2
(45) Date of Patent: *May 24, 2022

(54) ANTIGLARE GLASS SUBSTRATE (71) Applicant: AGC Inc., Tokyo (JP)

(72) Inventors: Hitoshi Mishiro, Tokyo (JP); Keiko Koyama, Tokyo (JP); Minoru Tamada, Tokyo (JP)

(73) Assignee: AGC INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/142,088

(22) Filed: Jan. 5, 2021

(65) Prior Publication Data
US 2021/0122672 A1 Apr. 29, 2021

Related U.S. Application Data (63) Continuation of application No. 15/934,023, filed on Mar. 23, 2018, now Pat. No. 10,981,827.

(30) Foreign Application Priority Data

Mar. 23, 2017 (JP) .............................. JP2017-057280

(51) Int. Cl.
*C03C 17/42* (2006.01)
*C03C 15/00* (2006.01)
(Continued)

(52) U.S. Cl.
CPC .............. *C03C 17/42* (2013.01); *C03C 15/00* (2013.01); *C03C 15/02* (2013.01); *C03C 17/30* (2013.01);
(Continued)

(58) Field of Classification Search
CPC ......... C03C 17/42; C03C 15/00; C03C 15/02; C03C 17/30; C03C 19/00; C03C 21/002; C03C 2204/08; C03C 2217/732; C03C 2217/76; C03C 2218/112; C03C 2218/154; C03C 2218/31; C03C 2218/34;
(Continued)

(56) References Cited

U.S. PATENT DOCUMENTS 8,003,194 B2   8/2011   Richter et al.
9,435,915 B1   9/2016   Lower et al.
(Continued)

FOREIGN PATENT DOCUMENTS

CN      104520249 A    4/2015
JP      2017-001940 A  1/2017
WO      WO-2014/119453 A1  8/2014

*Primary Examiner* — Nancy R Johnson
(74) *Attorney, Agent, or Firm* — Foley & Lardner LLP (57) ABSTRACT

An antiglare glass substrate includes a glass substrate having a first main surface and a second main surface that is opposite to the first main surface. The first main surface has undergone an antiglare treatment and a fluorine-containing organosilicon compound coating film as an antifouling film is laminated thereon. The first main surface partly includes a non-antiglare-treated portion that has not undergone the antiglare treatment. The non-antiglare-treated portion has a surface roughness Ra of less than 10 nm. A difference in height along a plate thickness direction of the glass substrate between the antiglare-treated portion that has undergone the antiglare treatment and the non-antiglare-treated portion is 10 μm or larger and 200 μm or less.

10 Claims, 3 Drawing Sheets (51) Int. Cl.
  *C03C 19/00*  (2006.01)
  *C03C 17/30*  (2006.01)
  *C03C 21/00*  (2006.01)
  *C03C 15/02*  (2006.01)
  *G02B 1/18*  (2015.01)
  *C09D 5/16*  (2006.01)
  *G02B 1/11*  (2015.01)
  *C09D 5/00*  (2006.01)

(52) U.S. Cl.
  CPC ............ *C03C 19/00* (2013.01); *C03C 21/002* (2013.01); *C09D 5/006* (2013.01); *C09D 5/1606* (2013.01); *G02B 1/11* (2013.01); *G02B 1/18* (2015.01); *C03C 2204/08* (2013.01); *C03C 2217/732* (2013.01); *C03C 2217/734* (2013.01); *C03C 2217/76* (2013.01); *C03C 2218/112* (2013.01); *C03C 2218/154* (2013.01); *C03C 2218/31* (2013.01); *C03C 2218/34* (2013.01); *Y10T 428/24355* (2015.01)

(58) Field of Classification Search
  CPC ........ C09D 5/006; C09D 5/1606; G02B 1/11; G02B 1/18; Y10T 428/24355; B32B 3/30; B32B 7/12; B32B 17/064; B32B 27/28; B32B 27/285; B32B 33/00; B32B 2307/40
  See application file for complete search history.

(56) References Cited

U.S. PATENT DOCUMENTS

| | | |
|---|---|---|
| 9,512,029 B2 | 12/2016 | Ehemann et al. |
| 2013/0323444 A1 | 12/2013 | Ehemann et al. |
| 2013/0323468 A1 | 12/2013 | Myers et al. |
| 2014/0322547 A1 | 10/2014 | Petzold et al. |
| 2016/0357294 A1 | 12/2016 | Ozeki et al. |
| 2017/0196109 A1 | 7/2017 | Ehemann et al. |
| 2018/0343758 A1 | 11/2018 | Ehemann et al. |
| 2019/0248098 A1 | 8/2019 | Ozeki et al. |
| 2020/0163244 A1 | 5/2020 | Ehemann et al. |

ANTIGLARE GLASS SUBSTRATE

CROSS-REFERENCE TO RELATED APPLICATIONS

This application is a Continuation of U.S. patent application Ser. No. 15/934,023, filed on Mar. 23, 2018, which is based upon and claims the benefit of priority of Japanese Patent Application No. 2017-057280 filed on Mar. 23, 2017. The entire contents of which are hereby incorporated by reference in their entireties.

TECHNICAL FIELD

The present invention relates to a glass substrate having antiglare properties, i.e., an antiglare glass substrate.

BACKGROUND ART

In recent display devices such as, for example, liquid-crystal display (LCD) devices, a cover constituted of a transparent base is disposed on a screen-surface side in order to protect the display device. Glass substrates are frequently used as such transparent bases from the standpoint of appearance. However, the disposition of a glass substrate on a display device often arouses a trouble that the reflection of peripheral things in the screen surface occurs when a viewer tries to view images displayed on the display device. Such reflection in the surface of the glass substrate not only makes it difficult for the viewer to view the displayed images but also gives an unpleasant feeling to the viewer.

An attempt has been made to inhibit such reflection by, for example, subjecting a glass substrate to an antiglare treatment for forming a rugged shape in a surface of the glass substrate.

Meanwhile, there frequently are cases where human fingers and the like touch the surface of the glass substrate serving as a cover of such a display device, and in such cases, sebaceous matter, etc. are prone to adhere to the surface of the glass substrate. Because the adhesion of sebaceous matter, etc. affects the visibility, use is made of a glass which has undergone an antifouling treatment on an antiglare-treated surface of the glass substrate.

Examples of the antiglare treatment include a treatment in which a surface of a glass substrate is etched (see, for example, Patent Document 1) and a treatment in which a film having a rugged shape is formed on a surface of a glass substrate (see, for example, Patent Document 2).

With the spread of LCD (liquid-crystal display device) and the like, new functions are coming to be required. For example, there are cases where a system for watching a driver of a motor vehicle, railroad car, or the like through a camera is mounted, as a measure against dozing, within the instrument panel, especially in, for example, the cluster including meters which is disposed in front of the driver. In such cases, a portion of the glass substrate which corresponds to a field of view of the camera is required not to have undergone an antiglare treatment.

In cases where such a glass substrate equipped with both a region which has undergone an antiglare treatment and a region which has not undergone the treatment is subjected to an antifouling treatment, there has been a problem in that an antifouling agent gathers at a boundary between these regions, making it impossible to obtain a sufficient effect.

PRIOR ART DOCUMENTS

Patent Documents

Patent Document 1: International Publication WO 2014/119453
Patent Document 2 U.S. Pat. No. 8,003,194

SUMMARY OF THE INVENTION

Problem that the Invention is to Solve

An object of the invention is to provide an antiglare glass substrate having an excellent antifouling effect, the antiglare glass substrate having an antiglare-treated surface which partly includes a non-antiglare-treated region that has undergone no antiglare treatment.

An antiglare glass substrate according to one embodiment of the present invention includes a glass substrate having a first main surface and a second main surface that is opposite to the first main surface, wherein the first main surface has undergone an antiglare treatment and a fluorine-containing organosilicon compound coating film as an antifouling film is laminated thereon, the first main surface partly includes a non-antiglare-treated portion that has not undergone the antiglare treatment, the non-antiglare-treated portion has a surface roughness Ra of less than 10 nm, a difference in height along a plate thickness direction of the glass substrate between the antiglare-treated portion that has undergone the antiglare treatment and the non-antiglare-treated portion is 10 µm or larger and 200 µm or less.

Effects of the Invention

According to the invention, an antifouling agent is inhibited from gathering and it is possible to provide an antiglare glass substrate including a non-antiglare-treated portion and having excellent antifouling properties.

DETAILED DESCRIPTION OF THE INVENTION

Modes for Carrying Out the Invention

Modes for carrying out the present invention are explained below by reference to the drawings. However, the invention is not limited to the following embodiments, which can be variously modified or changed within the scope of the invention.

First Embodiment

Figure 1:
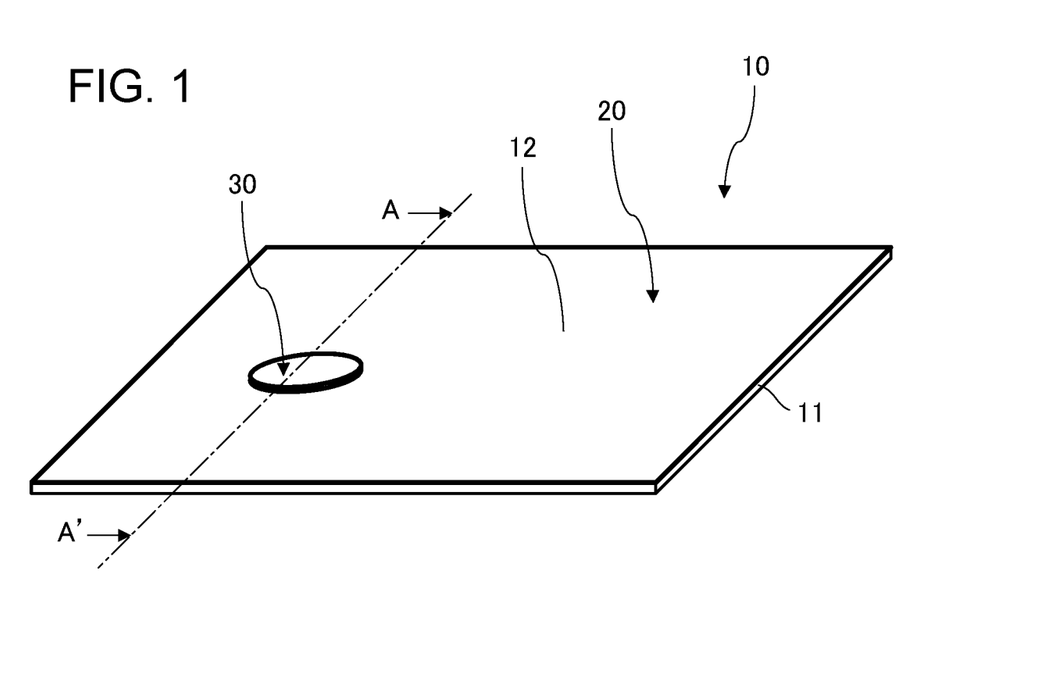
FIG. 1 is a perspective view schematically illustrating an antiglare glass substrate according to one embodiment of the invention.

An antiglare glass substrate according to this embodiment is explained using FIG. 1. FIG. 1 is a perspective view schematically illustrating an antiglare glass substrate according to this embodiment. The antiglare glass substrate 10 shown in FIG. 1 has a configuration including a glass substrate 11 having a first main surface, which has undergone an antiglare treatment. In the glass substrate 11 shown in FIG. 1, an upper surface is the first main surface, and a lower surface, which is opposite to the first main surface, is a second main surface. The antiglare glass substrate 10 according to this embodiment includes an antiglare-treated portion 20, which has undergone an antiglare treatment, provided to the first main surface of the glass substrate 11 and a non-antiglare-treated portion 30, which has undergone no antiglare treatment, provided to the first main surface of the glass substrate 11. An antifouling film 12 has been formed over the first main surface of the glass substrate 11.

In this embodiment, the first main surface of a glass substrate 11 is subjected to a surface treatment to form a rugged shape, thereby forming the antiglare-treated portion 20 of the antiglare glass substrate 10. Methods for the surface treatment performed for that purpose are not particularly limited, and use can be made of a method in which the main surface of the glass substrate is subjected to a surface treatment to form a desired rugged shape. Etching is generally used.

In the antiglare glass substrate 10 according to this embodiment, the antiglare-treated portion 20 has been formed by forming a rugged shape in the first main surface of the glass substrate 11 by giving a surface treatment to the first main surface. The antiglare-treated portion 20 hence has a higher haze than the non-antiglare-treated portion 30.

The haze of the antiglare-treated portion 20 is, for example, 0.5% to 70% in terms of haze for transmitted light in a visible light region. Meanwhile, the non-antiglare-treated portion 30 has a haze of, for example, less than 0.5% in terms of haze for transmitted light in a visible light region. The non-antiglare-treated portion 30 has no ruggedness due to a surface treatment such as that mentioned above. In this description, the term "haze" hereinafter means haze for transmitted light in a visible light region. The haze can be measured in accordance with JIS K 7136 (year 2000).

In cases where the haze of the antiglare-treated portion 20 is within that range, the antiglare glass substrate according to this embodiment has sufficient antiglare properties and can be more advantageously used as the cover member of a display device or the like or as a substrate integrated with a touch panel. The haze of the antiglare-treated portion 20 is preferably 2% or higher and 30% or less. In cases where the haze thereof is 2% or higher, this antiglare glass substrate can be visually ascertained to be inhibited from suffering light reflection in the substrate surface as compared with substrates which have not undergone an antiglare treatment. In cases where the haze thereof is 30% or less, irregular light reflection can be inhibited and, in the case of using this antiglare glass substrate as the cover member of a display device or as a substrate integrated with a touch panel, the visibility of images displayed on the display device can be sufficiently ensured. The haze thereof is preferably 2% or more and 28% or less, more preferably 5% or more and 26% or less.

From the standpoint of producing the effects shown above, the areal proportion of the non-antiglare-treated portion 30 in the first main surface of the glass substrate 11 is preferably 20% or less, more preferably 15% or less, even more preferably 10% or less.

Figure 2:
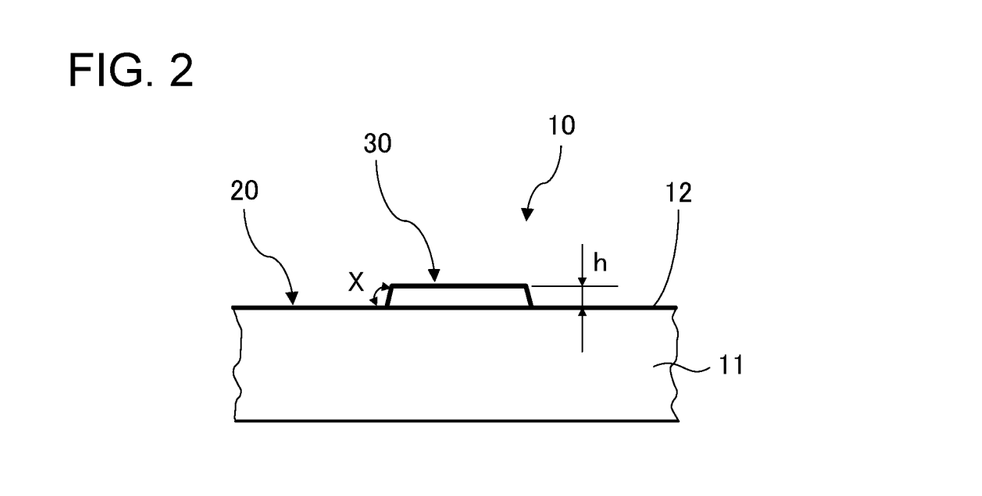
FIG. 2 is a cross-sectional view taken on the line A-A' of FIG. 1.

FIG. 2 is a cross-sectional view taken on the line A-A' of FIG. 1. In this embodiment, when attention is directed to height along a plate thickness direction of the glass substrate 11, it can be seen, as shown in FIG. 2, that the non-antiglare-treated portion 30 has a larger height than the antiglare-treated portion 20 and is protruding.

In this embodiment, a difference in height h, along the plate thickness direction of the glass substrate 11, between the antiglare-treated portion 20 and the non-antiglare-treated portion 30 is 10 µm or larger and 200 µm or less. In this description, the difference in height h, along the plate thickness direction of the glass substrate, between the antiglare-treated portion 20 and the non-antiglare-treated portion 30 is the difference in height therebetween as measured by examining the antiglare glass substrate in the state of including the antifouling film 12 formed over the first main surface of the glass substrate 11. In case where the difference in height h is less than 10 µm, a boundary between the antiglare-treated portion 20 and the non-antiglare-treated portion 30 has an insufficient height, and a connecting region between the antiglare-treated portion 20 and the non-antiglare-treated portion 30 has a gentle slope. Because of this, in a top view of the antiglare glass substrate 10, the boundary region appears to be different in appearance from the antiglare-treated portion 20 and the non-antiglare-treated portion 30 and is occasionally recognized as a blushed region such as a soil. Such blushed region indicates that because the antiglare treatment was performed for a short period of time, the reaction between the chemical used for the antiglare treatment and the glass substrate 11 could be uneven. Application of an antifouling agent to this connecting region may result in the gathering of the antifouling agent because of the unevenness in the reactivity of the antifouling agent with the connecting region. In case where the gathering of the antifouling agent has occurred, there is a possibility that hydrophobic groups of the antifouling agent might undesirably combine with each other in the connecting region, making the antifouling agent unable to function sufficiently. In addition, the gathering of the antifouling agent may result in a decrease in appearance. By regulating the difference in height h to 10 µm or larger, that problem can be avoided. However, in case where the difference in height h is larger than 200 µm, there are problems, for example, in that this antiglare glass substrate feels poor to the touch of a finger and the boundary is noticeable to impair the appearance. The difference in height h is preferably 10 µm or larger and 100 µm or less.

The difference in height h, along the plate thickness direction of the glass substrate, between the antiglare-treated portion 20 and the non-antiglare-treated portion 30 can be determined using, for example, laser microscope VK-X, manufactured by Keyence Corp. This laser microscope is used to acquire height mapping data on portions of the antiglare glass substrate 10 which include the antiglare-treated portion 20 and the non-antiglare-treated portion 30. The data are subjected to an inclination correction. From the height mapping data which have undergone the inclination correction, an average height of the non-antiglare-treated portion 30 is determined. Subsequently, an average height of the region of the antiglare-treated portion 20 which is separated by 1 mm from the edge surface of the non-antiglare-treated portion 30 is determined. Finally, the difference between these average heights is determined as the difference in height h. Devices usable for determining the difference in height h are not limited to such microscopes, and use can be made of a tracer type measuring device or the like. With respect to the method for calculating the height h in the embodiments, the same applies hereinafter.

As shown in FIG. 2, the non-antiglare-treated portion 30 has a cross-sectional shape along the plate thickness direction of the glass substrate 11, the cross-sectional shape being the shape of a trapezoidal shape in which an upper side which lies on the uppermost-surface side, is shorter than a bottom side which lies on the first-main-surface side. The non-antiglare-treated portion 30 and a sloped region make a shape of a frustum. The sloped region is a region lying between the antiglare-treated portion and the smooth portion (non-antiglare-treated portion 30). An angle X which a lateral surface of this frustum shape makes with the first main surface of the glass substrate 11 preferably satisfies 90°<X≤150°. This configuration can inhibit the antifouling agent from gathering. In addition, in cases where 90°<X, this antiglare glass substrate feels good to the touch of a finger, with little uncomfortable feeling. In cases where X≤150°, the difference in level between the non-antiglare-treated portion 30 and the surrounding portion is less noticeable. Such values of X are hence preferred. The value of X more preferably satisfies 90°<X≤140°, even more preferably 100°≤X≤140°, still more preferably 120° ≤X≤140°. As described later in the EXAMPLE, the region lying between the antiglare-treated portion and the smooth portion is defined as the sloped region, and the length Y thereof is measured, and then the value of X satisfying $h/Y=\tan(X/180\times\pi)$ is calculated to determine the angle X.

In this embodiment, various functional films (not shown) may have been disposed according to need between the first main surface of the glass substrate 11 and the antifouling film 12. In this case, the difference in height h, along the plate thickness direction of the glass substrate, between the antiglare-treated portion 20 and the non-antiglare-treated portion 30 is the difference in height therebetween as measured by examining the antiglare glass substrate in the state of including the various functional films and antifouling film 12 which have been formed over the first main surface of the glass substrate 11.

Examples of the functional films include low-reflection films. Materials of the low-reflection films are not particularly limited, and various materials can be utilized so long as the materials can inhibit reflection. For example, a low-reflection film having a configuration composed of stacked layers including a high-refractive-index layer and a low-refractive-index layer is possible.

This low-reflection film may have a configuration including one high-refractive-index layer and one low-refractive-index layer, or may have a configuration including two or more high-refractive-index layers and two or more low-refractive-index layers. In the case where two or more high-refractive-index layers and two or more low-refractive-index layers are included, this configuration is preferably one in which the high-refractive-index layers have been stacked alternately with the low-refractive-index layers.

From the standpoint of attaining sufficient antireflection performance, a preferred low-reflection film is a stacking composed of a plurality of stacked films (layers). For example, the stacking is preferably composed of two or more and six or less stacked layers in total, and is more preferably composed of two or more and four or less stacked layers in total. This stacking is preferably one composed of stacked layers including at least one high-refractive-index layer and at least one low-refractive-index layer as shown above, and it is preferable that the total number of the high-refractive-index layer(s) and low-refractive-index layer(s) should be within the range shown above.

The materials of the high-refractive-index layers and low-refractive-index layers are not particularly limited, and can be selected while taking account of the degree of required antireflection, production efficiency, etc. For constituting the high-refractive-index layer(s), it is preferred to use one or more materials selected from, for example, niobium oxide ($Nb_2O_5$), titanium oxide ($TiO_2$), zirconium oxide ($ZrO_2$), silicon nitride (SiN), and tantalum oxide ($Ta_2O_5$). As a material for constituting the low-refractive-index layer(s), it is preferred to use silicon oxide ($SiO_2$). Niobium oxide is especially preferred as a material for the high-refractive-index layers, from the standpoints of production efficiency and the degree of refractive index. Consequently, the low-reflection film is more preferably a stacking composed of one or more niobium oxide layers and one or more silicon oxide layers. The thickness of the low-reflection film is preferably 40 nm or more and 500 nm or less, more preferably 100 nm or more and 300 nm or less.

An adhesion layer (not shown) may be interposed between the glass substrate 11 and the antifouling film 12 for the purpose of improving adhesion between the glass substrate 11 and the antifouling film 12. In the case of interposing an adhesion layer, the interposition may be attained by forming the adhesion layer on the first main surface of the glass substrate 11 before the antifouling film 12 is deposited. A silicon oxide film is suitable for use as the adhesion layer. The thickness thereof is preferably 2 nm or more and 50 nm or less, more preferably 5 nm or more and 20 nm or less.

In the case where the antiglare glass substrate according to this embodiment is for use as, for example, the cover glass of a portable electronic appliance, the non-antiglare-treated portion 30 is disposed in a region which is to lie in front of a camera or in a region where a fingerprint sensor is to be disposed. In the case where the antiglare glass substrate is for use as a protective member for other sensors, the non-antiglare-treated portion 30 is disposed in a region through which the visible light or radio wave for sensing passes. The non-antiglare-treated portion 30 in this embodiment hence has a surface roughness Ra of less than 10 nm. This is intended to prevent the non-antiglare-treated portion 30 from constituting an obstacle to the camera function, fingerprint sensor function, etc. The surface roughness Ra of the non-antiglare-treated portion 30 is preferably 5 nm or less. The lower limit of the surface roughness Ra is not particularly limited, however, it is preferably 0.5 nm or more, more preferably 1 nm or more.

The non-antiglare-treated portion 30 can be formed, for example, by applying a protective film to an area which is to be the non-antiglare-treated portion, when the first main surface of a glass substrate 11 is subjected to a surface treatment in order to form a rugged shape in the surface. As the protective film to be applied, use can be made, for example, of a protective film obtained by applying an acrylic adhesive to a polyethylene-based film or an acrylic film. Alternatively, that area may be masked by printing a resin such as polypropylene, polyethylene, poly(ethylene terephthalate), poly(vinyl chloride), polyimide, poly(butylene terephthalate), or ethylene/butyl acetate copolymer. After formation of the antiglare-treated portion 20, the protective film or the mask is removed. The area to be the non-antiglare-treated portion is not particularly limited in the top-view shape thereof, and a shape such as a circular, elliptic, triangular, rectangular, square, or trapezoidal shape can be suitably selected. The shape of the protective film to be applied to the area to be the non-antiglare-treated portion may be suitably regulated so that the non-antiglare-treated portion has a desired shape. In the case where the non-antiglare-treated portion is, for example, circular, the size thereof is preferably 1 mm or more and 50 mm or less in diameter.

In the case of a polygonal shape such as a rectangular shape, the length of each side is preferably 1 mm or more and 50 mm or less.

The antiglare-treated portion 20 can be formed, for example, by forming a rugged shape in the first main surface of a glass substrate 11 by a physical or chemical treatment. Examples include a method in which a frosting treatment is given to the first main surface of a glass substrate 11. The frosting treatment can be carried out, for example, by immersing the first main surface of the glass substrate 11 to be treated, in a hydrogen fluoride and ammonium fluoride mixture solution to chemically treat the immersed surface. Especially in a frosting treatment method in which the surface is chemically treated with a liquid chemical such as hydrogen fluoride, microcracks are less apt to generate in the surface being treated, hardly resulting in a decrease in mechanical strength. This method can hence be advantageously used as a surface treatment method for forming a rugged shape in the first main surface of the glass substrate 11.

Also usable besides methods based on such a chemical treatment are methods based on a physical treatment, such as the so-called sandblasting, in which, for example, a powder of crystalline silicon dioxide or a silicon carbide powder is blown against the first main surface of the glass substrate 11 by compressed air or a treatment in which the first main surface is ground with a water-damped brush to which a powder of crystalline silicon dioxide, silicon carbide powder, or the like has been adhered.

After ruggedness is thus formed, chemical etching of the main surface of the glass substrate 11 is generally conducted in order to regulate the surface shape. This etching not only enables the glass substrate 11 to have a desired value of haze in accordance with the etching amount, but also can eliminate cracks generated, for example, by the sandblasting and reduce glittering. The etching may be performed with the protective film or mask unremoved or after removal thereof, whichever method can be selected at will in accordance with the amount of glass removed by the frosting treatment.

A preferred method for the etching is one in which a glass substrate to be treated is immersed in a solution containing hydrogen fluoride as a main component. Examples of ingredients which may be contained besides hydrogen fluoride include hydrochloric acid, nitric acid, and citric acid. The inclusion of these ingredients is effective in inhibiting alkali components of the glass from reacting with the hydrogen fluoride to locally cause a precipitation reaction and in allowing the etching to proceed evenly over the surface.

For forming the antifouling film 12, a fluorine-containing organosilicon compound or the like can be used. Any fluorine-containing organosilicon compound capable of imparting antifouling properties, water repellency, and oil repellency can be used in this embodiment without particular limitations. Preferred examples of commercial fluorine-containing organosilicon compounds having one or more groups selected from the group consisting of polyfluoropolyether groups, polyfluoroalkylene groups, and polyfluoroalkyl groups include KP-801 (trade name; manufactured by Shin-Etsu Chemical Co., Ltd.), KY-178 (trade name; manufactured by Shin-Etsu Chemical Co., Ltd.), KY-130 (trade name; manufactured by Shin-Etsu Chemical Co., Ltd.), KY-185 (trade name; manufactured by Shin-Etsu Chemical Co., Ltd.), OPTOOL (registered trademark) DSX and OPTOOL AES (trade names; both manufactured by Daikin Industries, Ltd.), and S-550 (manufactured by Asahi Glass Co., Ltd.). The thickness of the antifouling film 12 is not particularly limited, and is preferably 1 to 20 nm, more preferably 2 to 10 nm.

In the antiglare glass substrate 10 according to this embodiment, the difference in height h along the plate thickness direction of the glass substrate 11 between the antiglare-treated portion 20 and the non-antiglare-treated portion 30 is 10 μm or higher and 200 μm or less. Because of this, the antifouling agent has not gathered at the boundary between the antiglare-treated portion 20 and the non-antiglare-treated portion 30, and a satisfactory antifouling effect is obtained. In addition, any unevenness in color which may occur in the area having a difference in level is not noticeable. Such values of the difference in height h are hence preferred.

As the glass substrate 11, use can be made of, for example, glass substrates having various shapes and consisting of various materials depending on the use. The glass substrate 11 may be a plate having both a flat portion and a bent portion. The glass substrate 11 is not limited to a plate and may be a film shape. Any glass substrate can be used so long as it is transparent, and it may be a colored substrate so long as effects such as visibility are not lessened thereby.

In the case of using an inorganic glass as the glass substrate 11, the plate thickness thereof is preferably 0.5 mm or more and 5 mm or less. When the plate thickness is equal to or more than the above lower limit, the antiglare glass substrate 10 having high strength and good texture can be obtained. The plate thickness thereof is more preferably 0.7 mm or more and 3 mm or less, even more preferably 1 mm or more and 3 mm or less. The plate thickness of the glass substrate 11 may be even or uneven. When the plate thickness thereof is uneven, a cross-sectional shape in a plate thickness direction may be, for example, a trapezoidal shape, a triangular shape, C-shape, or S-shape, and it is not particularly limited.

Examples of the glass composition of the glass substrate 11 and the antiglare glass substrate 10 include a glass which contains, as represented by mole% based on oxides, from 50 to 80% of $SiO_2$, from 0.1 to 25% of $Al_2O_3$, from 3 to 30% of $Li_2O+Na_2O+K_2O$, from 0 to 25% of MgO, from 0 to 25% of CaO, and from 0 to 5% of $ZrO_2$. However, the glass composition thereof is not particularly limited. More specifically, the following glass compositions are mentioned. For example, the wording "containing from 0 to 25% of MgO" means that MgO, although not essential, may be contained in an amount of up to 25%.

(i) A glass which contains, as represented by mole% based on oxides, from 63 to 73% of $SiO_2$, from 0.1 to 5.2% of $Al_2O_3$, from 10 to 16% of $Na_2O$, from 0 to 1.5% of $K_2O$, from 0 to 5% of $Li_2O$, from 5 to 13% of MgO, and from 4 to 10% of CaO;

(ii) A glass which contains, as represented by mole% based on oxides, from 50 to 74% of $SiO_2$, from 1 to 10% of $Al_2O_3$, from 6 to 14% of $Na_2O$, from 3 to 11% of $K_2O$, from 0 to 5% of $Li_2O$, from 2 to 15% of MgO, from 0 to 6% of CaO, and from 0 to 5% of $ZrO_2$, and in which the total content of $SiO_2$ and $Al_2O_3$ is 75% or less, the total content of $Na_2O$ and $K_2O$ is from 12 to 25%, and the total content of MgO and CaO is from 7 to 15%;

(iii) A glass which contains, as represented by mole% based on oxides, from 68 to 80% of $SiO_2$, from 4 to 10% of $Al_2O_3$, from 5 to 15% of $Na_2O$, from 0 to 1% of $K_2O$, from 0 to 5% of $Li_2O$, from 4 to 15% of MgO, and from 0 to 1% $ZrO_2$;

(iv) A glass which contains, as represented by mole% based on oxides, from 67 to 75% of $SiO_2$, from 0 to 4% of $Al_2O_3$, from 7 to 15% of $Na_2O$, from 1 to 9% of $K_2O$, from 0 to 5% of $Li_2O$, from 6 to 14% of MgO, and from 0 to 1.5% of $ZrO_2$, and in which the total content of $SiO_2$ and $Al_2O_3$ is from 71 to 75% and the total content of $Na_2O$ and $K_2O$ is from 12 to 20%, and when CaO is contained, the content thereof is less than 1%.

(v) A glass which contains, as represented by mole% based on oxides, from 50 to 80% of $SiO_2$, from 2 to 25% of $Al_2O_3$, from 0 to 10% of $Li_2O$, from 0 to 18% of $Na_2O$, from 0 to 10% of $K_2O$, from 0 to 15% of MgO, from 0 to 5% of CaO, and from 0 to 5% $ZrO_2$;

(vi) A glass which contains, as represented by mole% based on oxides, from 50 to 74% of $SiO_2$, from 1 to 10% of $Al_2O_3$, from 6 to 14% of $Na_2O$, from 3 to 11% of $K_2O$, from 2 to 15% of MgO, from 0 to 6% of CaO, and from 0 to 5% of $ZrO_2$, and in which the total content of $SiO_2$ and $Al_2O_3$ is 75% or less, the total content of $Na_2O$ and $K_2O$ is from 12 to 25%, and the total content of MgO and CaO is from 7 to 15%;

(vii) A glass which contains, as represented by mole% based on oxides, from 68 to 80% of $SiO_2$, from 4 to 10% of $Al_2O_3$, from 5 to 15% of $Na_2O$, from 0 to 1% of $K_2O$, from 4 to 15% of MgO, and from 0 to 1% of $ZrO_2$, and in which the total content of $SiO_2$ and $Al_2O_3$ is 80% or less;

(viii) A glass which contains, as represented by mole% based on oxides, from 67 to 75% of $SiO_2$, from 0 to 4% of $Al_2O_3$, from 7 to 15% of $Na_2O$, from 1 to 9% of $K_2O$, from 6 to 14% of MgO, from 0 to 1% of CaO, and from 0 to 1.5% of $ZrO_2$, and in which the total content of $SiO_2$ and $Al_2O_3$ is from 71 to 75%, and the total content of $Na_2O$ and $K_2O$ is from 12 to 20%;

(ix) A glass which contains, as represented by mole% based on oxides, from 60 to 75% of $SiO_2$, from 0.5 to 8% of $Al_2O_3$, from 10 to 18% of $Na_2O$, from 0 to 5% of $K_2O$, from 6 to 15% of MgO, and from 0 to 8% of CaO;

(x) A glass which contains, as represented by mass% based on oxides, from 63 to 75% of $SiO_2$, from 3 to 12% of $Al_2O_3$, from 3 to 10% of MgO, from 0.5 to 10% of CaO, from 0 to 3% of SrO, from 0 to 3% of BaO, from 10 to 18% of $Na_2O$, from 0 to 8% of $K_2O$, and from 0 to 3% of $ZrO_2$, from 0.005 to 0.25% of $Fe_2O_3$, and $R_2O/Al_2O_3$ (in the expression, $R_2O$ represents $Na_2O+K_2O$) is 2.0 or more and 4.6 or less.

(xi) A glass which contains, as represented by mass% based on oxides, from 66 to 75% of $SiO_2$, from 0 to 3% of $Al_2O_3$, from 1 to 9% of MgO, from 1 to 12% of CaO, from 10 to 16% of $Na_2O$, and from 0 to 5% of $K_2O$.

When the glass is colored and used, a coloring agent may be added as long as it does not inhibit the achievement of the desired chemical-strengthening properties.

Examples of the coloring agent may include $Co_3O_4$, MnO, $MnO_2$, $Fe_2O_3$, NiO, CuO, $Cu_2O$, $Cr_2O_3$, $V_2O_5$, $Bi_2O_3$, $SeO_2$, $TiO_2$, $CeO_2$, $Er_2O_3$, $Nd_2O_3$, which respectively are metal oxides of Co, Mn, Fe, Ni, Cu, Cr, V, Bi, Se, Ti, Ce, Er, and Nd, which have absorption in the visible region.

When colored glass is used as the glass, the glass may contain, as represented by mole% based on oxides, 7% or less of a coloring component (at least one component selected from the group consisting of each metal oxide of Co, Mn, Fe, Ni, Cu, Cr, V, Bi, Se, Ti, Ce, Er and Nd). When the content of the coloring component exceeds 7%, the glass is likely to be devitrified easily. The content of the coloring component is preferably 5% or less, more preferably 3% or less, still more preferably 1% or less. In addition, the glass substrate may appropriately contain $SO_3$, chloride, fluoride, etc. as a refining agent during melting.

The glass substrate 11 may be subjected to a chemical strengthening treatment or physical strengthening treatment, or the glass substrate does not have to be subjected to these treatments. However, the chemical strengthening treatment is preferred. When a relatively thin glass like the above mentioned inorganic glass is used, the chemical strengthening treatment is preferably performed to obtain a chemically strengthened glass because an intended strength can be attained. When the chemical strengthening treatment is performed, the glass substrate 11 is preferably an aluminosilicate glass.

The chemical strengthening treatment is a treatment in which the glass surface is subjected to an ion exchange treatment to thereby form a surface layer having compressive stress. Specifically, an alkali metal ion having a small ion radius (typically Li ion or Na ion) on the surface of a glass plate is exchanged with an alkali ion having a larger ion radius (typically Na ion or K ion for Li ion, and K ion for Na ion) by the ion exchange at a temperature which is equal to or lower than the glass transition point.

Second Embodiment

Figure 3:
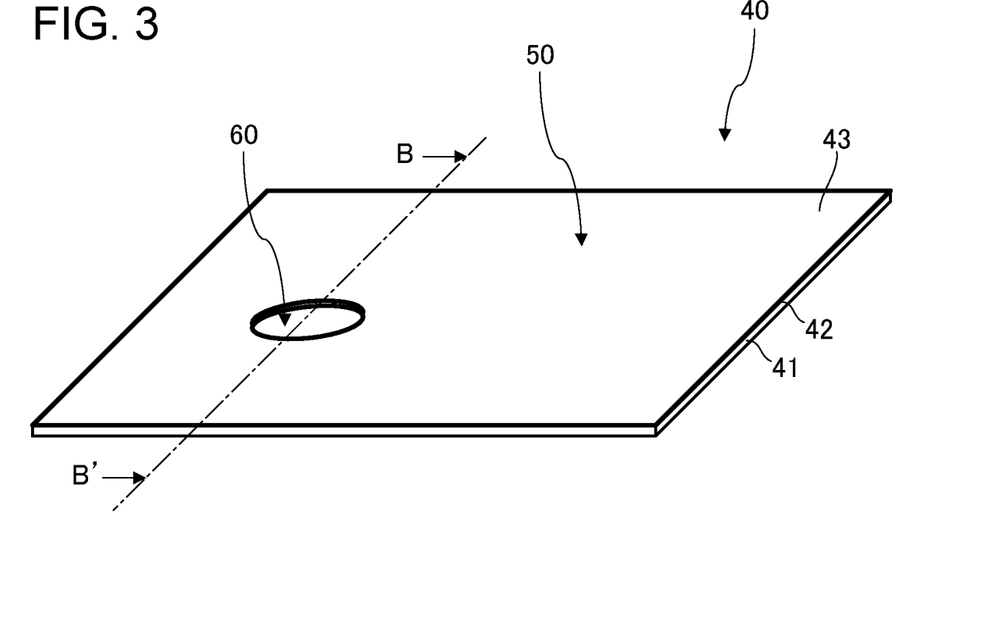
FIG. 3 is a perspective view schematically illustrating an antiglare glass substrate according to another embodiment of the invention.

An antiglare glass substrate according to this embodiment is explained using FIG. 3. FIG. 3 is a perspective view schematically illustrating an antiglare glass substrate according to this embodiment. The antiglare glass substrate 40 shown in FIG. 3 has a configuration including a glass substrate 41 having a first main surface, which has undergone an antiglare treatment. In the glass substrate 41 shown in FIG. 3, the upper surface is the first main surface, and the lower surface, which is opposite to the first main surface, is a second main surface. The antiglare glass substrate 40 according to this embodiment includes an antiglare-treated portion 50, which has undergone an antiglare treatment, provided to the first main surface of the glass substrate 41 and a non-antiglare-treated portion 60, which has undergone no antiglare treatment, provided to the first main surface of the glass substrate 41. This embodiment differs from the first embodiment in that the antiglare-treated portion 50 is formed by disposing an antiglare film 42 on the first main surface of the glass substrate 41. In this embodiment, that portion of the first main surface of the glass substrate 41 which is not covered with the antiglare film 42 is the non-antiglare-treated portion 60.

The antiglare film 42 in this embodiment may be any of a wide range of organic-material or inorganic-material films each having a rugged shape formed in the surface thereof. The antiglare film 42 preferably has satisfactory adhesion to the first main surface of the glass substrate 41. It is also preferable that the antiglare film 42 should have a lower refractive index than the glass substrate 41, from the standpoint of improving the antireflection function of the antiglare glass substrate 40.

In this embodiment, an antifouling film 43 has been formed over the first main surface of the glass substrate 41. In the antiglare-treated portion 50 of the antiglare glass substrate 40, the antifouling film 43 has been formed on the antiglare film 42 disposed on the first main surface of the glass substrate 41. In the non-antiglare-treated portion 60 of the antiglare glass substrate 40, the antifouling film 43 has been formed directly on the first main surface of the glass substrate 41.

In the antiglare glass substrate 40 according to this embodiment, the antiglare-treated portion 50 has a higher haze than the non-antiglare-treated portion 60 because of the antiglare film 42 formed on the first main surface of the glass substrate 41. The haze of the antiglare-treated portion 50 is, for example, 0.5% to 70% or less. Meanwhile, the haze of the non-antiglare-treated portion 60 is, for example, less than 0.5%.

Figure 4:
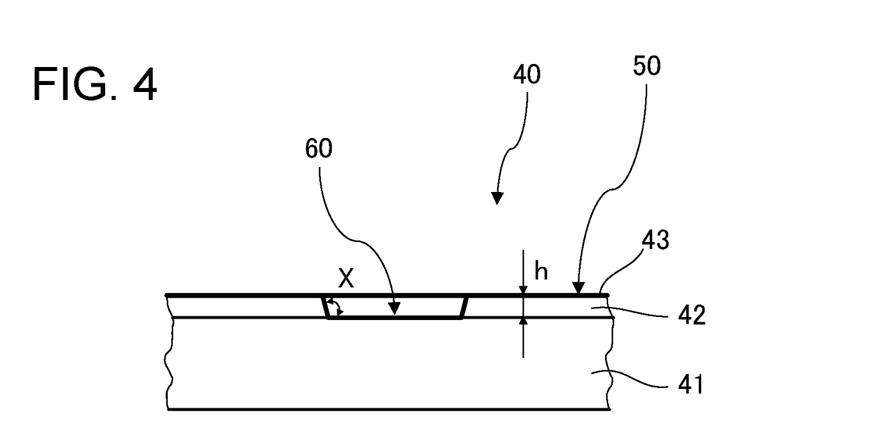
FIG. 4 is a cross-sectional view taken on the line B-B' of FIG. 3.

FIG. 4 is a cross-sectional view of the plane B-B' of FIG. 3 viewed from the given direction. In this embodiment, when attention is directed to height along the plate thickness direction of the glass substrate 41, it can be seen that the non-antiglare-treated portion 60 has a smaller height than the antiglare-treated portion 50 and is recessed.

In this embodiment, the difference in height h, along the plate thickness direction of the glass substrate 41, between the antiglare-treated portion 50 and the non-antiglare-treated portion 60 is 10 µm or larger and 200 µm or less. In this description, the difference in height h, along the plate thickness direction of the glass substrate, between the antiglare-treated portion 50 and the non-antiglare-treated portion 60 is the difference in height therebetween as measured by examining the antiglare glass substrate in the state of including the antifouling film 43 formed over the first main surface of the glass substrate 41. In case where the difference in height h is less than 10 µm, the boundary between the antiglare-treated portion 50 and the non-antiglare-treated portion 60 has an insufficient height, and the connecting region between the antiglare-treated portion 50 and the non-antiglare-treated portion 60 has a gentle slope. Because of this, in a top view of the antiglare glass substrate 40, the boundary region appears to be different in appearance from the antiglare-treated portion 50 and the non-antiglare-treated portion 60 and is occasionally recognized as a blushed region such as a soil. Such blushed region indicates that because the antiglare treatment was performed for a short period of time, the reaction between the chemical used for the antiglare treatment and the glass substrate 41 could be uneven. Application of an antifouling agent to this connecting region may result in the gathering of the antifouling agent because of the unevenness in the reactivity of the antifouling agent with the connecting region. In case where the gathering of the antifouling agent has occurred, there is a possibility that hydrophobic groups of the antifouling agent might undesirably combine with each other in the connecting region, making the antifouling agent unable to function sufficiently. In addition, the gathering of the antifouling agent may result in a decrease in appearance. By regulating the difference in height h to 10 µm or larger, that problem can be avoided. However, in case where the difference in height h is larger than 200 µm, there are problems, for example, in that this antiglare glass substrate feels poor to the touch of a finger and the boundary is noticeable to impair the appearance. The difference in height h is preferably 10 µm or larger and 100 µm or less.

As shown in FIG. 4, the non-antiglare-treated portion 60 has a cross-sectional shape along the plate thickness direction of the glass substrate 41, the cross-sectional shape being the shape of an inverted trapezoidal shape in which the upper side, which lies on the uppermost-surface side, is longer than the bottom side, which lies on the first-main-surface side of the glass substrate 41. The non-antiglare-treated portion 60 and the sloped region make a shape of an inverted-frustum. The angle X which a lateral surface of this inverted-frustum shape makes with the first main surface of the glass substrate 41 preferably satisfies 90°<X≤150°, more preferably 90°<X≤140°. This configuration can inhibit the antifouling agent from gathering. In addition, in cases where 90°<X, this antiglare glass substrate feels good to the touch of a finger, with little uncomfortable feeling. In cases where X≤150°, the difference in level between the non-antiglare-treated portion 60 and the surrounding portion is less noticeable. Such values of X are hence preferred.

In this embodiment, various functional films (not shown) may have been disposed according to need between the first main surface of the glass substrate 41 and the antifouling film 43. In the antiglare-treated portion 50, where the antiglare film 42 has been formed on the first main surface of the glass substrate 41, various functional films may have been disposed on the antiglare film 42 or between the first main surface of the glass substrate 41 and the antiglare film 42. In the case of disposing various functional film, the difference in height h, along the plate thickness direction of the glass substrate 41, between the antiglare-treated portion 50 and the non-antiglare-treated portion 60 is the difference in height therebetween as measured by examining the antiglare glass substrate in the state of including the antiglare film 42, various functional films, and antifouling film 43 which have been formed over the first main surface of the glass substrate 41.

Examples of the functional films include low-reflection films. Materials of the low-reflection films are not particularly limited, and various materials can be utilized so long as the materials can inhibit reflection. For example, a low-reflection film having a configuration composed of stacked layers including a high-refractive-index layer and a low-refractive-index layer is possible.

This low-reflection film may have a configuration including one high-refractive-index layer and one low-refractive-index layer, or may have a configuration including two or more high-refractive-index layers and two or more low-refractive-index layers. In the case where two or more high-refractive-index layers and two or more low-refractive-index layers are included, this configuration is preferably one in which the high-refractive-index layers have been stacked alternately with the low-refractive-index layers.

From the standpoint of attaining sufficient antireflection performance, a preferred low-reflection film is a stacking composed of a plurality of stacked films (layers). For example, the stacking is preferably composed of two or more and six or less stacked layers in total, and is more preferably composed of two or more and four or less stacked layers in total. This stacking is preferably one composed of stacked layers including at least one high-refractive-index layer and at least one low-refractive-index layer as shown above, and it is preferable that the total number of the high-refractive-index layer(s) and low-refractive-index layer(s) should be within the range shown above.

The materials of the high-refractive-index layers and low-refractive-index layers are not particularly limited, and can be selected while taking account of the degree of required antireflection, production efficiency, etc. For constituting the high-refractive-index layer(s), it is preferred to use one or more materials selected from, for example, niobium oxide ($Nb_2O_5$), titanium oxide ($TiO_2$), zirconium oxide ($ZrO_2$), silicon nitride (SiN), and tantalum oxide ($Ta_2O_5$). As a material for constituting the low-refractive-index layer(s), it is preferred to use silicon oxide ($SiO_2$).

Niobium oxide is especially preferred as a material for the high-refractive-index layers, from the standpoints of production efficiency and the degree of refractive index. Consequently, the low-reflection film is more preferably a stacking composed of one or more niobium oxide layers and one or more silicon oxide layers. The thickness of the low-reflection film is preferably 40 nm or more and 500 nm or less, more preferably 100 nm or more and 300 nm or less.

In the case where the antiglare glass substrate according to this embodiment is for use as, for example, the cover glass of a portable electronic appliance, the non-antiglare-treated portion 60 is disposed in a region which is to lie in front of a camera or in a region where a fingerprint sensor is to be disposed. In the case where the antiglare glass substrate is for use as a protective member for other sensors, the non-antiglare-treated portion 60 is disposed in a region through which the visible light or radio wave for sensing passes. The non-antiglare-treated portion 60 in this embodiment hence has a surface roughness Ra of less than 10 nm. This is intended to prevent the non-antiglare-treated portion 60 from constituting an obstacle to the camera function, fingerprint sensor function, etc. The surface roughness Ra of the non-antiglare-treated portion 60 is preferably 5 nm or less.

The non-antiglare-treated portion 60 can be formed, for example, by applying a protective film to an area which is to be the non-antiglare-treated portion 60, when an antiglare film 42 is formed on the first main surface of a glass substrate 41. As the protective film to be applied, use can be made, for example, of a protective film obtained by applying an acrylic adhesive to a polyethylene-based or acrylic film. Alternatively, that area may be masked with a resin by printing. The area to be the non-antiglare-treated portion is not particularly limited in the top-view shape thereof, and a shape such as a circular, elliptic, triangular, rectangular, square, or trapezoidal shape can be suitably selected. The shape of the protective film to be applied to the area to be the non-antiglare-treated portion may be suitably regulated so that the non-antiglare-treated portion has a desired shape. In the case where the non-antiglare-treated portion is, for example, circular, the size thereof is preferably 1 mm or more and 50 mm or less in diameter. In the case of a polygonal shape such as a rectangular shape, the length of each side is preferably 1 mm or more and 50 mm or less.

The antiglare-treated portion 50 can be obtained, for example, by forming an antiglare film 42 on the first main surface of a glass substrate 41 by coating. The refractive index of the antiglare film 42 can be regulated, for example, by changing the material of the matrix of the antiglare film 42 or the porosity of the antiglare film 42 or by incorporating a substance having any desired refractive index into the matrix. For example, the refractive index of the antiglare film 42 can be reduced by heightening the porosity thereof. Alternatively, the refractive index of the antiglare film 42 can be reduced by incorporating a substance having a low refractive index (e.g., solid silica particles or hollow silica particles) into the matrix.

The antiglare film 42 preferably includes silica as a main component, but is not limited to this configuration. In cases where the antiglare film 42 includes silica as a main component, this antiglare film 42 is apt to have a reduced refractive index (reflectance). In addition, this antiglare film 42 is satisfactory in terms of chemical stability, etc., and has satisfactory adhesion to the glass substrate. In this description, the expression "including silica as a main component" means that $SiO_2$ is contained in an amount of 50% by mass or more. It is, however, preferable that $SiO_2$ be contained in an amount of 90% by mass or more.

In the case where the antiglare film 42 includes silica as a main component, this antiglare film 42 may be constituted of silica only or may contain one or more components other than silica in a small amount. Examples of the other components include ions and compounds, e.g., oxides, of one or more elements selected from Li, B, C, N, F, Na, Mg, Al, P, S, K, Ca, Ti, V, Cr, Mn, Fe, Co, Ni, Cu, Zn, Ga, Sr, Y, Zr, Nb, Ru, Pd, Ag, In, Sn, Hf, Ta, W, Pt, Au, Bi, and lanthanoids.

Examples of the antiglare film 42 including silica as a main component include: one formed from a coating composition containing a silica precursor; one formed from a coating composition containing silica particles; and one constituted of, for example, a resin film in which silica is not a main component.

In this embodiment, a non-antiglare-treated portion 60 may be formed after an antiglare film 42 has been formed. Specifically, a non-antiglare-treated portion 60 can be formed by partly removing the antiglare film 42 by performing laser processing or grinding with a cylindrical grindstone or by grinding the antiglare film 42 with a buff, brush, or the like after the area which is to be the antiglare-treated portion 50 is masked. It is, however, noted that high surface roughness Ra of the non-antiglare-treated portion 60 renders the camera function, fingerprint sensor function, or the like unable to be sufficiently obtained.

For forming the antifouling film 43, a fluorine-containing organosilicon compound or the like can be used. Any fluorine-containing organosilicon compound capable of imparting antifouling properties, water repellency, and oil repellency can be used in this embodiment without particular limitations. Preferred examples of commercial fluorine-containing organosilicon compounds having one or more groups selected from the group consisting of polyfluoropolyether groups, polyfluoroalkylene groups, and polyfluoroalkyl groups include KP-801 (trade name; manufactured by Shin-Etsu Chemical Co., Ltd.), KY-178 (trade name; manufactured by Shin-Etsu Chemical Co., Ltd.), KY-130 (trade name; manufactured by Shin-Etsu Chemical Co., Ltd.), KY-185 (trade name; manufactured by Shin-Etsu Chemical Co., Ltd.), OPTOOL (registered trademark) DSX and OPTOOL AES (trade names; both manufactured by Daikin Industries, Ltd.), and S-550 (manufactured by AGC, Ltd.). The thickness of the antifouling film 43 is not particularly limited, and is preferably 1 to 20 nm, more preferably 2 to 10 nm.

In the antiglare glass substrate 40 according to this embodiment, the difference in height h along the plate thickness direction of the glass substrate 41 between the antiglare-treated portion 50 and the non-antiglare-treated portion 60 is 10 µm or larger and 200 µm or less. Because of this, the antifouling agent has not gathered at the boundary between the antiglare-treated portion 50 and the non-antiglare-treated portion 60, and a satisfactory antifouling effect is obtained. In addition, any unevenness in color which may occur in the area having a difference in level is not noticeable. Such values of the difference in height h are hence preferred.

In the antiglare glass substrate 40 according to this embodiment, use can be made, as the glass substrate 41, of the glass substrates as described above.

Third Embodiment

Figure 5:
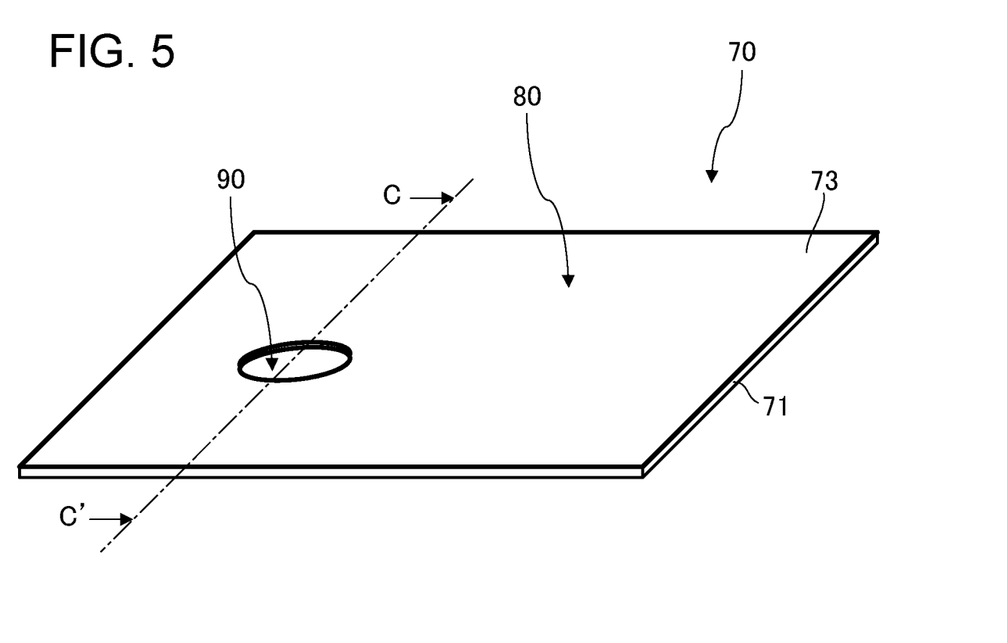
FIG. 5 is a perspective view schematically illustrating an antiglare glass substrate according to still another embodiment of the invention.

An antiglare glass substrate according to this embodiment is explained using FIG. 5. FIG. 5 is a perspective view schematically illustrating an antiglare glass substrate according to this embodiment. The antiglare glass substrate 70 shown in FIG. 5 has a configuration including a glass substrate 71 having a first main surface, which has undergone an antiglare treatment. In the glass substrate 71 shown in FIG. 5, the upper surface is the first main surface, and the lower surface, which is opposite to the first main surface, is a second main surface. The antiglare glass substrate 70 according to this embodiment includes an antiglare-treated portion 80, which has undergone an antiglare treatment, provided to the first main surface of the glass substrate 71 and a non-antiglare-treated portion 90, which has undergone no antiglare treatment, provided to the first main surface of the glass substrate 71. An antifouling film 73 has been formed over the first main surface of the glass substrate 71.

In this embodiment, there are no particular limitations on manners in which the antiglare-treated portion 80 and the non-antiglare-treated portion 90 are formed. For example, the portions 80 and 90 can be formed in the following manner. A surface treatment is given to the whole first main surface of a glass substrate 71 to form a rugged shape. In the glass substrate 71 in this state, the whole first main surface thereof is an antiglare treated portion. The glass substrate 71 in this state is processed by grinding the area which is to be a non-antiglare-treated portion. Specifically, a non-antiglare-treated portion can be formed by performing laser processing or grinding with a cylindrical grindstone or by grinding the first main surface with a buff, brush, or the like after the area which is to be the antiglare-treated portion is masked. It is, however, noted that high surface roughness Ra of the non-antiglare-treated portion renders the camera function, fingerprint sensor function, or the like unable to be sufficiently obtained.

In the antiglare glass substrate 70 according to this embodiment, the antiglare-treated portion 80 has a higher haze than the non-antiglare-treated portion 90. The haze of the antiglare-treated portion 80 is, for example, 0.5% to 70%. Meanwhile, the haze of the non-antiglare-treated portion 90 is, for example, less than 0.5%.

Figure 6:
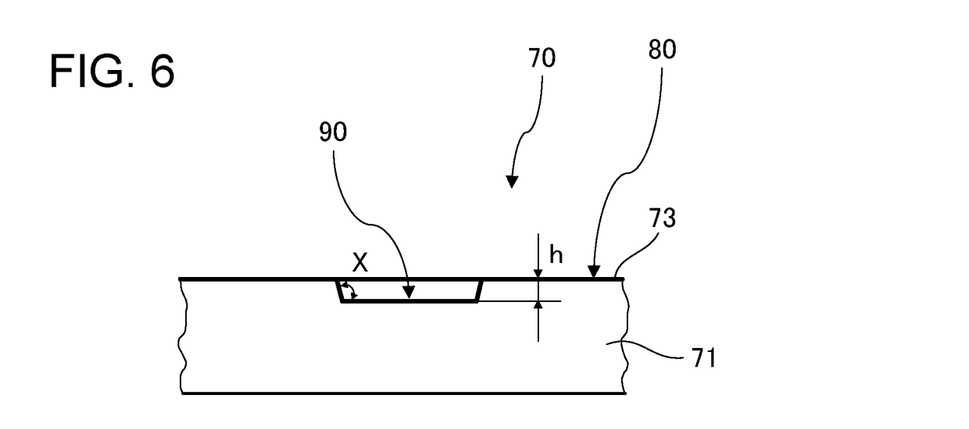
FIG. 6 is a cross-sectional view taken on the line C-C' of FIG. 5.

FIG. 6 is a cross-sectional view of the plane C-C' of FIG. 5 viewed from the given direction. In this embodiment, when attention is directed to height along the plate thickness direction of the glass substrate 71, it can be seen that the non-antiglare-treated portion 90 has a smaller height than the antiglare-treated portion 80 and is recessed.

In this embodiment, the difference in height h, along the plate thickness direction of the glass substrate 71, between the antiglare-treated portion 80 and the non-antiglare-treated portion 90 is 10 μm or larger and 200 μm or less. In this description, the difference in height h, along the plate thickness direction of the glass substrate, between the antiglare-treated portion 80 and the non-antiglare-treated portion 90 is the difference in height therebetween as measured by examining the antiglare glass substrate 70 in the state of including the antifouling film 73 formed over the first main surface of the glass substrate 71. In case where the difference in height h is less than 10 μm, the boundary between the antiglare-treated portion 80 and the non-antiglare-treated portion 90 has an insufficient height, and the connecting region between the antiglare-treated portion 80 and the non-antiglare-treated portion 90 has a gentle slope. Because of this, in a top view of the antiglare glass substrate 70, the boundary region appears to be different in appearance from the antiglare-treated portion 80 and the non-antiglare-treated portion 90 and is occasionally recognized as a blushed region such as a soil. Such blushed region indicates that because the antiglare treatment was performed for a short period of time, the reaction between the chemical used for the antiglare treatment and the glass substrate 71 could be uneven. Application of an antifouling agent to this connecting region may result in the gathering of the antifouling agent because of the unevenness in the reactivity of the antifouling agent with the connecting region. In case where the gathering of the antifouling agent has occurred, there is a possibility that hydrophobic groups of the antifouling agent might undesirably combine with each other in the connecting region, making the antifouling agent unable to function sufficiently. In addition, the gathering of the antifouling agent may result in a decrease in appearance. By regulating the difference in height h to 10 μm or larger, that problem can be avoided. However, in case where the difference in height h is larger than 200 μm, there are problems, for example, in that this antiglare glass substrate feels poor to the touch of a finger and the boundary is noticeable to impair the appearance. The difference in height h is preferably 10 μm or larger and 100 μm or less.

As shown in FIG. 6, the non-antiglare-treated portion 90 is a recess formed on the first-main-surface side of the glass substrate 71, and has a cross-sectional shape along the plate thickness direction of the glass substrate 71, the cross-sectional shape being the shape of an inverted trapezoidal shape in which the upper side, which lies at the same height as the first main surface of the glass substrate 71, is longer than the bottom side, which lies below the first main surface. The non-antiglare-treated portion 90 and the sloped region make a shape of an inverted-frustum. The angle X which a lateral surface of this inverted-frustum shape makes with the first main surface of the glass substrate 71 preferably satisfies $90°<X \leq 150°$, more preferably $90°<X \leq 140°$. This configuration can inhibit the antifouling agent from gathering. In addition, in cases where $90°<X$, this antiglare glass substrate feels good to the touch of a finger, with little uncomfortable feeling. In cases where $X<150°$, the difference in level between the non-antiglare-treated portion 90 and the surrounding portion is less noticeable. Such values of X are hence preferred.

In this embodiment, various functional films (not shown) may have been disposed according to need between the first main surface of the glass substrate 71 and the antifouling film 73. In the case of disposing various functional film, the difference in height h, along the plate thickness direction of the glass substrate 71, between the antiglare-treated portion 80 and the non-antiglare-treated portion 90 is the difference in height therebetween as measured by examining the antiglare glass substrate in the state of including the various functional films and antifouling film 73 which have been formed over the first main surface of the glass substrate 71.

Examples of the functional films include low-reflection films. Materials of the low-reflection films are not particularly limited, and various materials can be utilized so long as the materials can inhibit reflection. For example, a low-reflection film having a configuration composed of stacked layers including a high-refractive-index layer and a low-refractive-index layer is possible.

This low-reflection film may have a configuration including one high-refractive-index layer and one low-refractive-index layer, or may have a configuration including two or more high-refractive-index layers and two or more low-refractive-index layers. In the case where two or more high-refractive-index layers and two or more low-refractive-index layers are included, this configuration is preferably one in which the high-refractive-index layers have been stacked alternately with the low-refractive-index layers.

From the standpoint of attaining sufficient antireflection performance, a preferred low-reflection film is a stacking composed of a plurality of stacked films (layers). For example, the stacking is preferably composed of two or more and six or less stacked layers in total, and is more preferably composed of two or more and four or less stacked layers in total. This stacking is preferably one composed of stacked layers including at least one high-refractive-index layer and at least one low-refractive-index layer as shown above, and it is preferable that the total number of the high-refractive-index layer(s) and low-refractive-index layer(s) should be within the range shown above.

The materials of the high-refractive-index layers and low-refractive-index layers are not particularly limited, and can be selected while taking account of the degree of required antireflection, production efficiency, etc. For constituting the high-refractive-index layer(s), it is preferred to use one or more materials selected from, for example, niobium oxide ($Nb_2O_5$), titanium oxide ($TiO_2$), zirconium oxide ($ZrO_2$), silicon nitride (SiN), and tantalum oxide ($Ta_2O_5$). As a material for constituting the low-refractive-index layer(s), it is preferred to use silicon oxide ($SiO_2$).

Niobium oxide is especially preferred as a material for the high-refractive-index layers, from the standpoints of production efficiency and the degree of refractive index. Consequently, the low-reflection film is more preferably a stacking composed of one or more niobium oxide layers and one or more silicon oxide layers. The thickness of the low-reflection film is preferably 40 nm or more and 500 nm or less, more preferably 100 nm or more and 300 nm or less.

In the case where the antiglare glass substrate according to this embodiment is for use as, for example, the cover glass of a portable electronic appliance, the non-antiglare-treated portion 90 is disposed in a region which is to lie in front of a camera or in a region where a fingerprint sensor is to be disposed. In the case where the antiglare glass substrate is for use as a protective member for other sensors, the non-antiglare-treated portion 90 is disposed in a region through which the visible light or radio wave for sensing passes. The non-antiglare-treated portion 90 in this embodiment hence has a surface roughness Ra of less than 10 nm. This is intended to prevent the non-antiglare-treated portion 90 from constituting an obstacle to the camera function, fingerprint sensor function, etc. The surface roughness Ra of the non-antiglare-treated portion 90 is preferably 5 nm or less.

For forming the antifouling film 73, a fluorine-containing organosilicon compound or the like can be used. Any fluorine-containing organosilicon compound capable of imparting antifouling properties, water repellency, and oil repellency can be used in this embodiment without particular limitations. Preferred examples of commercial fluorine-containing organosilicon compounds having one or more groups selected from the group consisting of polyfluoropolyether groups, polyfluoroalkylene groups, and polyfluoroalkyl groups include KP-801 (trade name; manufactured by Shin-Etsu Chemical Co., Ltd.), KY-178 (trade name; manufactured by Shin-Etsu Chemical Co., Ltd.), KY-130 (trade name; manufactured by Shin-Etsu Chemical Co., Ltd.), KY-185 (trade name; manufactured by Shin-Etsu Chemical Co., Ltd.), OPTOOL (registered trademark) DSX and OPTOOL AES (trade names; both manufactured by Daikin Industries, Ltd.), and S-550 (manufactured by AGC, Ltd.). The thickness of the antifouling film 73 is not particularly limited, and is preferably 1 to 20 nm, more preferably 2 to 10 nm.

In the antiglare glass substrate 70 according to this embodiment, the difference in height h along the plate thickness direction of the glass substrate 71 between the antiglare-treated portion 80 and the non-antiglare-treated portion 90 is 10 μm or larger and 200 μm or less. Because of this, the antifouling agent has not gathered at the boundary between the antiglare-treated portion 80 and the non-antiglare-treated portion 90, and a satisfactory antifouling effect is obtained. In addition, any unevenness in color which may occur in the area having a difference in level is not noticeable. Such values of the difference in height h are hence preferred.

In the antiglare glass substrate 70 according to this embodiment, use can be made, as the glass substrate 71, of the glass substrates as described above.

EXAMPLES

The present invention is explained below by reference to specific Examples, but the invention is not limited to the following Examples. Examples 1 to 4, 6, 7, 13, and 14 are Examples according to the present invention, and Examples 5, 8 to 12, and 15 to 17 are Comparative Examples.

(1) Production of Samples

Example 1

Antiglare glass sample 1 was produced in the following manner. In this Example, an unstrengthened glass for chemical strengthening (trade name DRAGONTRAIL (registered trademark), manufactured by Asahi Glass Co., Ltd.; size, 300 mm×300 mm; thickness, 1.3 mm) was used as a glass substrate.

First, an acid-resistant protective film was applied to the main surface (second main surface) of the glass substrate which was on the side opposite to the side where an antiglare-treated portion was to be formed. A piece of acid-resistant protective film which had been cut out so as to have a diameter of 20 mm was applied as a mask to a substantially central portion of the main surface (first main surface) of the glass substrate which was on the side where an antiglare-treated portion was to be formed.

Subsequently, this glass substrate was immersed for 3 minutes in a 3% by weight hydrogen fluoride solution to remove fouling substances adherent to the unmasked region of the first main surface of the glass substrate and to simultaneously perform preliminary processing to remove a surface layer to reduce the thickness of the glass substrate by 10 μm. Furthermore, the glass substrate was immersed for 3 minutes in a mixed solution of 8% by weight hydrogen fluoride and 8% by weight potassium fluoride to give a frosting treatment to the unmasked region of the first main surface of the glass substrate. This glass substrate which had undergone the frosting treatment was subjected to etching by immersing the glass substrate for 3 minutes in a 10% by weight hydrogen fluoride solution (etching period, 3 minutes), thereby regulating the haze to 15%. In the first main surface of the glass substrate, the central portion to which the mask having a dimeter of 20 mm had been applied was to be a smooth portion, and the other portion was to be an antiglare-treated portion. Thus, an unstrengthened antiglare glass substrate was obtained.

Thereafter, the protective film and the mask were peeled from the unstrengthened antiglare glass substrate obtained, and chemical strengthening was conducted. The unstrengthened antiglare glass substrate which had been etched was immersed for 1 hour in potassium nitrate salt kept molten by heating at 450° C., subsequently pulled out of the molten salt, and gradually cooled to room temperature over 1 hour, thereby obtaining a chemically strengthened antiglare glass substrate.

Subsequently, a low-reflection film was formed on the first main surface of the chemically strengthened antiglare glass substrate. The low-reflection film was formed on the first main surface of the antiglare glass substrate in the following manner. First, while introducing a mixed gas obtained by mixing argon gas with 10% by volume oxygen gas, a niobium oxide target (trade name NBO Target, manufacture by AGC Ceramics Co., Ltd.) was used to conduct pulse sputtering under the conditions of a pressure of 0.3 Pa, frequency of 20 kHz, power density of 3.8 W/cm$^2$, and inversion pulse width of 5 μsec to form a high-refractive-index layer constituted of niobium oxide (niobia) and having a thickness of 13 nm on the first main surface of the glass substrate.

Next, while introducing a mixed gas obtained by mixing argon gas with 40% by volume oxygen gas, a silicon target was used to conduct pulse sputtering under the conditions of a pressure of 0.3 Pa, frequency of 20 kHz, power density of 3.8 W/cm$^2$, and inversion pulse width of 5 μsec to form a low-refractive-index layer constituted of silicon oxide (silica) and having a thickness of 30 nm on the high-refractive-index layer.

Subsequently, while introducing a mixed gas obtained by mixing argon gas with 10% by volume oxygen gas, a niobium oxide target (trade name NBO Target, manufacture by AGC Ceramics Co., Ltd.) was used to conduct pulse sputtering under the conditions of a pressure of 0.3 Pa, frequency of 20 kHz, power density of 3.8 W/cm$^2$, and inversion pulse width of 5 μsec to form a high-refractive-index layer constituted of niobium oxide (niobia) and having a thickness of 110 nm on the low-refractive-index layer.

Next, while introducing a mixed gas obtained by mixing argon gas with 40% by volume oxygen gas, a silicon target was used to conduct pulse sputtering under the conditions of a pressure of 0.3 Pa, frequency of 20 kHz, power density of 3.8 W/cm$^2$, and inversion pulse width of 5 μsec to form a low-refractive-index layer constituted of silicon oxide (silica) and having a thickness of 90 nm.

Thus, a low-reflection film composed of four layers in total of niobium oxide (niobia) and silicon oxide (silica) was formed on the chemically strengthened antiglare glass substrate.

A treatment for antifouling film formation was subsequently conducted. First, a material (trade name KY-185, manufactured by Shin-Etsu Chemical Co., Ltd.) for fluorine-containing organosilicon compound coating films (antifouling films) was introduced into a heating vessel. The heating vessel was then evacuated with a vacuum pump for 10 hours or longer to remove the solvent contained in the solution, thereby obtaining a composition for forming fluorine-containing organosilicon compound coating films.

The heating vessel containing the composition for forming fluorine-containing organosilicon compound coating films was then heated to 270° C. After reaching 270° C., the heated state was maintained for 10 minutes until the temperature became stable. The composition for forming fluorine-containing organosilicon compound coating films was then supplied to the low-reflection film of the chemically strengthened antiglare glass substrate disposed in the vacuum chamber, through a nozzle connected to the heating vessel containing the composition for forming fluorine-containing organosilicon compound coating films, thereby conducting film deposition.

The film deposition was conducted while measuring the film thickness with a quartz oscillator monitor disposed in the vacuum chamber. The film deposition was continued until the thickness of the fluorine-containing organosilicon compound film being formed on the low-reflection film of the chemically strengthened antiglare glass substrate became 10 nm. At the time when the thickness of the fluorine-containing organosilicon compound film reached 10 nm, the supply of the feed material through the nozzle was stopped. Thereafter, antiglare glass sample 1 thus produced was taken out of the vacuum chamber. The antiglare glass sample 1 taken out was placed on a hot plate, with the film-coated surface facing upward, and was heat-treated in the air at 150° C. for 60 minutes.

Example 2

Antiglare glass sample 2 was produced under the same conditions as in Example 1, except that in the preliminary processing, the thickness of the glass substrate was reduced by 80 μm and that the etching conditions for the etching were regulated so as to result in the same haze as in Example 1.

Example 3

Antiglare glass sample 3 was produced under the same conditions as in Example 1, except that in the preliminary processing, the thickness of the glass substrate was reduced by 15 μm, that the frosting was conducted with the mask remaining unpeeled and the protective film having been peeled off, and that the mask was then peeled off and the etching with the hydrogen fluoride solution was conducted.

Example 4

Antiglare glass sample 4 was produced under the same conditions as in Example 1, except that the preliminary processing was omitted and that the etching conditions for the etching were regulated so as to result in the same haze as in Example 1.

Example 5

Antiglare glass sample 5 was produced under the same conditions as in Example 3, except that in the preliminary processing, the thickness of the glass substrate was reduced by 5 μm and that the etching conditions for the etching were regulated so as to result in the same haze as in Example 3.

Example 6

Antiglare glass sample 6 was produced under the same conditions as in Example 1, except that the haze was regulated to 25%.

Example 7

Antiglare glass sample 7 was produced under the same conditions as in Example 6, except that in the preliminary processing, the thickness of the glass substrate was reduced by 15 μm, and that after the frosting, the mask was peeled off and the etching with the hydrogen fluoride solution was conducted.

Example 8

Antiglare glass sample 8 was produced under the same conditions as in Example 7, except that in the preliminary processing, the thickness of the glass substrate was reduced by 5 μm and that the etching conditions for the etching were regulated so as to result in the same haze as in Example 7.

Example 9

The same glass substrate as in Example 1 (trade name DRAGONTRAIL (registered trademark), manufactured by Asahi Glass Co., Ltd.; size, 300 mm×300 mm; thickness, 1.3 mm) was used. An acid-resistant protective film was applied to the main surface (second main surface) of the glass substrate which was on the side opposite to the side where an antiglare-treated portion was to be formed. Subsequently, this glass substrate was immersed in a 3% by weight hydrogen fluoride solution to remove fouling substances adherent to the glass substrate surfaces. Furthermore, the glass substrate was immersed for 3 minutes in a mixed solution of 15% by weight hydrogen fluoride and 15% by weight potassium fluoride to give a frosting treatment to the main surface (first main surface) of the glass substrate which was on the side where no protective film had been applied. The glass substrate which had undergone the frosting was subjected to etching by immersing the glass substrate for 4 minutes in a 10% by weight hydrogen fluoride solution (etching period, 4 minutes), thereby regulating the haze to 15%. Thereafter, a substantially central portion of the etched surface was ground with a cylindrical grindstone having a diameter of 5 mm and abrasive grains of cerium oxide having a Knoop hardness of 3,000 to remove a surface layer from the etched surface to a depth of 15 μm in a circular area with a diameter of 20 mm. Thereafter, chemical strengthening, a treatment for low-reflection film formation, and a treatment for antifouling film formation were conducted in the same manner as in Example 1. In the etched main surface (first main surface), the central portion where the etched surface had been removed by the grinding (recess formed by glass removal) was a smooth portion, and the other portion was an antiglare-treated portion. Thus, antiglare glass sample 9 was obtained.

Example 10

Antiglare glass sample 10 was produced under the same conditions as in Example 9, except that the amount of glass to be removed by the grinding was changed to a depth of 600 μm.

Example 11

Antiglare glass sample 11 was produced under the same conditions as in Example 9, except that the amount of glass to be removed by the grinding was changed to a depth of 5 μm and that the grindstone was used so that the angle between the bottom surface and lateral surface of the recess formed by glass removal was 160°.

Example 12

Treatments ranging to etching were conducted in the same manner as in Example 9. Thereafter, a protective film was applied to the etched surface (first main surface) except a substantially central portion thereof having a diameter of 20 mm, and the exposed portion was ground with a tape using ceramic abrasive grains #10,000 to remove a surface layer from the etched surface to a depth of 10 μm. Thereafter, chemical strengthening, a treatment for low-reflection film formation, and a treatment for antifouling film formation were conducted in the same manner as in Example 1. In the etched main surface, the central portion with a diameter of 20 mm where the protective film had not been applied was a non-antiglare-treated portion, and the other portion was an antiglare-treated portion. Thus, antiglare glass sample 12 was obtained.

Example 13

Use was made of a glass substrate (trade name DRAGONTRAIL (registered trademark), manufactured by Asahi Glass Co., Ltd.; size, 300 mm×300 mm; thickness, 1.3 mm) which had been chemically strengthened in the same manner as in Example 1. An acid-resistant mask which had been cut out so as to have a diameter of 20 mm was applied to a substantially central portion of the main surface (first main surface) of the glass substrate which was on the side where an antiglare-treated portion was to be formed. Subsequently, that surface of the glass substrate was washed with an aqueous solution of sodium hydrogen carbonate, thereafter rinsed with ion-exchanged water, and dried. Next, the glass substrate was heated in an oven to maintain a surface temperature of 80° C., and a dispersion of hollow fine silica particles was applied to the surface of the glass substrate by spraying under the conditions of a spraying pressure of 0.4 MPa, application rate of 7 mL/min, nozzle travel speed of 750 mm/min, spray pitch of 22 mm, distance between nozzle tip and glass substrate of 115 mm, and droplet diameter of 6.59 μm so as to result in a film thickness of 10 μm. Thus, an antiglare film having a haze of 10% was formed. Thereafter, the mask was removed, and a treatment for low-reflection film formation and a treatment for antifouling film formation were conducted in the same manner as in Example 1. In the main surface on which the antiglare film had been formed, the central portion with a diameter of 20 mm where the mask had been applied was a smooth portion, and the other portion was an antiglare-treated portion. Thus, antiglare glass sample 13 was obtained.

Example 14

Antiglare glass sample 14 was produced under the same conditions as in Example 13, except that the film thickness of the antiglare film was changed to 50 μm, resulting in a haze of 8%.

Example 15

Antiglare glass sample 15 was produced under the same conditions as in Example 13, except that the film thickness of the antiglare film was changed to 5 μm, resulting in a haze of 12%.

Example 16

Formation of an antiglare film, a treatment for low-reflection film formation, and a treatment for antifouling film formation were conducted in the same manner as in Example 13, except that the application of the mask was omitted. Grinding was then conducted in the same manner as in Example 9 to produce antiglare glass sample 16.

Example 17

An antiglare treatment, a treatment for low-reflection film formation, and a treatment for antifouling film formation were conducted in the same manner as in Example 16. Grinding was then conducted in the same manner as in Example 12 to produce antiglare glass sample 17.

(2) Evaluation Methods

Methods used for evaluating the properties of the antiglare glass substrates obtained in Example 1 to Example 17 given above are explained below.

(Determination of Surface Shape)

The surface shape of the smooth portion of each of the samples produced in Examples 1 to 17, which had undergone the formation of an antifouling film, was determined in the following manner. The smooth portion was examined with a laser microscope (trade name VK-9700, manufactured by Keyence Corp.) at a magnification of 1,000 diameters to obtain a plane profile. In accordance with JIS B 0601 (2001), values of surface roughness Ra and RMS were calculated from the plane profile obtained. Of the smooth portions, those having an Ra satisfying Ra<10 nm were defined as non-antiglare-treated portions. In antiglare glass samples 9 to 12, 16, and 17, the smooth portions each had an Ra not less than 10 nm; these samples each failed to have a non-antiglare-treated portion.

Meanwhile, a region which was separated by 2 mm from the edge of the smooth portion was regarded as a representative region of the antiglare-treated portion, and a difference in surface level (difference in height h) between this region and the smooth portion was obtained. Next, a region corresponding to two times the RSm of the representative region of the antiglare-treated portion was divided into grid sections, and Rz was calculated for each of the sections lying over the whole field of view. Any region having the same Rz as the representative region of the antiglare-treated portion was defined as an antiglare-treated portion. The region lying between the antiglare-treated portion and the smooth portion was defined as a sloped region, and the length Y thereof was measured. The value of X satisfying $h/Y=\tan(X/180\cdot\pi)$ was calculated to determine the angle X.

(Haze)

With respect to each of the samples produced in Examples 1 to 17, which had undergone the formation of an antifouling film, the antiglare-treated portion was examined for transmission haze. The haze was measured with a hazeometer (Type HZ-V3, manufactured by Suga Test Instruments Co., Ltd.).

(Measurement of Transmittance)

With respect to each of the samples produced in Examples 1 to 17, which had undergone the formation of an antifouling film, the smooth portion was examined for transmittance. The transmittance was measured with ultraviolet/visible-region spectrophotometer SolidSpec-3700, manufactured by Shimadzu Corp.

(Fingerprint Wiping-off Test)

The antifouling film of each antiglare-treated portion was examined for fingerprint removability by wiping in the following manner. Using artificial sweat, fingerprints were impressed on the areas having a difference in level in the samples at the same pressing force. Thereafter, a wiping-off test was performed in which a gauze impregnated with ethanol was used to wipe off the fingerprints and the number of wiping motions to elimination of the fingerprints was counted. The case where the fingerprints were able to be wiped off by up to 10 wiping motions is indicated by ; the case where the fingerprint were able to be wiped off by 11 to 50 wiping motions is indicated by Δ; and the case where the fingerprints were unable to be wiped off even by 50 wiping motions is indicated by ×.

(Feel to the Touch)

The area near the boundary between the antiglare-treated portion and the smooth portion was evaluated for feel to the tough. The examination was made by ten persons in five grades: 1, excellent; 2, good; 3, fair; 4, poor; 5, very poor. Each sample was evaluated in terms of average for the ten persons.

The results of the evaluation of Examples 1 to 17 are shown in the following tables.

TABLE 1

| AG glass | | Sample 1 | Sample 2 | Sample 3 | Sample 4 | Sample 5 | Sample 6 | Sample 7 | Sample 8 |
|---|---|---|---|---|---|---|---|---|---|
| Method of AG treatment | | frosting | frosting | frosting | frosting | frosting | frosting | frosting | frosting |
| Amount removed in preliminary processing step (μm) | | 10 | 80 | 15 | — | 5 | 10 | 15 | 5 |
| Method for forming non-AG-treated portion | | mask | mask | mask | mask | mask | mask | mask | mask |
| Mask during etching | | present | present | absent | present | absent | present | absent | absent |
| Difference in height, h (μm) | | 30 | 100 | 15 | 20 | 5 | 20 | 15 | 5 |
| Angle, X (°) | | 138 | 140 | 140 | 138 | 143 | 141 | 142 | 142 |
| AG-treated portion | Haze (%) | 15 | 15 | 15 | 15 | 15 | 25 | 25 | 25 |
| | Fingerprint wiping-off test | ○ | ○ | ○ | ○ | × | ○ | ○ | × |
| Connecting region | Feel to the touch | 2 | 3 | 2 | 2 | 2 | 2 | 2 | 2 |
| Smooth portion | Ra (nm) | 4 | 4 | 4 | 4 | 4 | 4 | 4 | 4 |
| | Transmittance (%) | 98 | 98 | 98 | 98 | 98 | 98 | 98 | 98 |

TABLE 2

| AG glass | Sample 9 | Sample 10 | Sample 11 | Sample 12 | Sample 13 | Sample 14 | Sample 15 | Sample 16 | Sample 17 |
|---|---|---|---|---|---|---|---|---|---|
| Method of AG treatment | frosting | frosting | frosting | frosting | AG film | AG film | AG film | AG film | AG film |
| Amount removed in preliminary processing step (μm) | — | — | — | — | — | — | — | — | — |
| Method for forming non-AG-treated portion | grinding with cylindrical grindstone | grinding with cylindrical grindstone | grinding with cylindrical grindstone | grinding with tape | mask | mask | mask | grinding with cylindrical grindstone | grinding with tape |
| Mask during etching | — | — | — | — | — | — | — | — | — |
| Difference in height, h (μm) | 15 | 600 | 5 | 10 | 10 | 50 | 5 | 10 | 10 |
| Angle, X (°) | 90 | 90 | 160 | 93 | 126 | 132 | 110 | 90 | 94 |

TABLE 2-continued

| AG glass | | Sample 9 | Sample 10 | Sample 11 | Sample 12 | Sample 13 | Sample 14 | Sample 15 | Sample 16 | Sample 17 |
|---|---|---|---|---|---|---|---|---|---|---|
| AG-treated portion | Haze (%) | 15 | 15 | 15 | 15 | 10 | 8 | 12 | 10 | 7 |
| | Fingerprint wiping-off test | ○ | ○ | Δ | ○ | ○ | ○ | x | ○ | ○ |
| Connecting region | Feel to the touch | 3 | 4 | 4 | 3 | 2 | 3 | 2 | 3 | 3 |
| Smooth portion | Ra (nm) | 15 | 15 | 15 | 15 | 4 | 4 | 4 | 10 | 10 |
| | Transmittance (%) | 98 | 98 | 98 | 98 | 98 | 98 | 98 | 98 | 98 |

* AG: antiglare

Table 1 and Table 2 show the following. In the case where the difference in surface level between the antiglare-treated portion and the smooth portion (non-antiglare-treated portion) was less than 10 μm, the fingerprints were unable to be wiped off by 10 wiping motions in the wiping-off test, which was performed under the same conditions. It was thus ascertained that excellent antifouling performance was not obtained in that case especially in the area near the connection region between the antiglare-treated portion and the smooth portion (non-antiglare-treated portion). In addition, in the connecting regions of the antiglare glass samples which each had a difference in surface level between the antiglare-treated portion and the smooth portion (non-antiglare-treated portion) of less than 10 μm, blushing such as a soil was observed. Meanwhile, it was understood that in the case were the angle X exceeded 150°, antifouling performance was obtained although poorer than usual ones.

While the present invention has been described in detail and with reference to specific embodiments thereof, it will be apparent to one skilled in the art that various changes and modifications can be made therein without departing from the spirit and scope thereof.

DESCRIPTION OF THE REFERENCE NUMERALS 10, 40, 70 Antiglare glass substrate
11, 41, 71 Glass substrate
12, 43, 73 Antifouling film
20, 50, 80 Antiglare-treated portion
30, 60, 90 Non-antiglare-treated portion
42 Antiglare film

The invention claimed is:

1. An antiglare glass substrate comprising a glass substrate having a first main surface and a second main surface that is opposite to the first main surface, wherein:
the first main surface includes an antiglare-treated portion that has undergone an antiglare treatment;
the first main surface further comprises an antifouling film comprising a fluorine- containing organosilicon compound coating film laminated thereon;
the antiglare-treated portion is a rugged shape formed in the first main surface;
the first main surface partly includes a non-antiglare-treated portion that has not undergone the antiglare treatment;
the non-antiglare-treated portion has a surface roughness Ra of less than 10 nm;
a difference in height along a plate thickness direction of the glass substrate between the antiglare-treated portion that has undergone the antiglare treatment and the non-antiglare-treated portion is 10 μm or larger and 100 μm or less;
the first main surface further includes a sloped region connecting the antiglare-treated portion and the non-antiglare-treated portion; and
the non-antiglare-treated portion and the sloped region make a shape of a frustum.

2. The antiglare glass substrate according to claim 1, wherein the antiglare-treated portion has a haze regarding transmitted light in a visible light region of 2% or higher and 30% or less.

3. The antiglare glass substrate according to claim 1, wherein the non-antiglare-treated portion has the surface roughness Ra of 5 nm or less.

4. The antiglare glass substrate according to claim 1, wherein the non-antiglare-treated portion has a larger height than the antiglare-treated portion along the plate thickness direction of the glass substrate.

5. The antiglare glass substrate according to claim 1, wherein the non-antiglare-treated portion has a smaller height than the antiglare-treated portion along the plate thickness direction of the glass substrate.

6. The antiglare glass substrate according to claim 1, wherein in a cross-sectional shape along the plate thickness direction of the glass substrate, a lateral surface of the frustum makes an angle X with the first main surface of the glass substrate, the angle X satisfying $90°<X\leq150°$.

7. The antiglare glass substrate according to claim 1, wherein a low-reflection film and the fluorine-containing organosilicon compound coating film have been laminated in this order on a surface of the first main surface.

8. The antiglare glass substrate according to claim 1, wherein the glass substrate is an aluminosilicate glass.

9. The antiglare glass substrate according to claim 1, wherein the glass substrate is a chemically strengthened glass.

10. The antiglare glass substrate according to claim 1, wherein the difference in height along the plate thickness direction of the glass substrate between the antiglare-treated portion that has undergone the antiglare treatment and the non-antiglare-treated portion is 10 μm or larger and 50 μm or less.

* * * * *